METHOD OF MAKING A SEMICONDUCTOR PACKAGE

Filed June 8, 1961

INVENTOR.
David P. Weber
BY
D. N. Shampo
ATTORNEY

United States Patent Office 3,242,555

Patented Mar. 29, 1966

3,242,555
METHOD OF MAKING A SEMICONDUCTOR PACKAGE

David P. Weber, Kokomo, Ind., assignor to General Motors Corporation, Detroit, Mich., a corporation of Delaware Filed June 8, 1961, Ser. No. 115,787
4 Claims. (Cl. 29—155.5)

Figures 1, 2, 3, 4, 5, 6, 7:
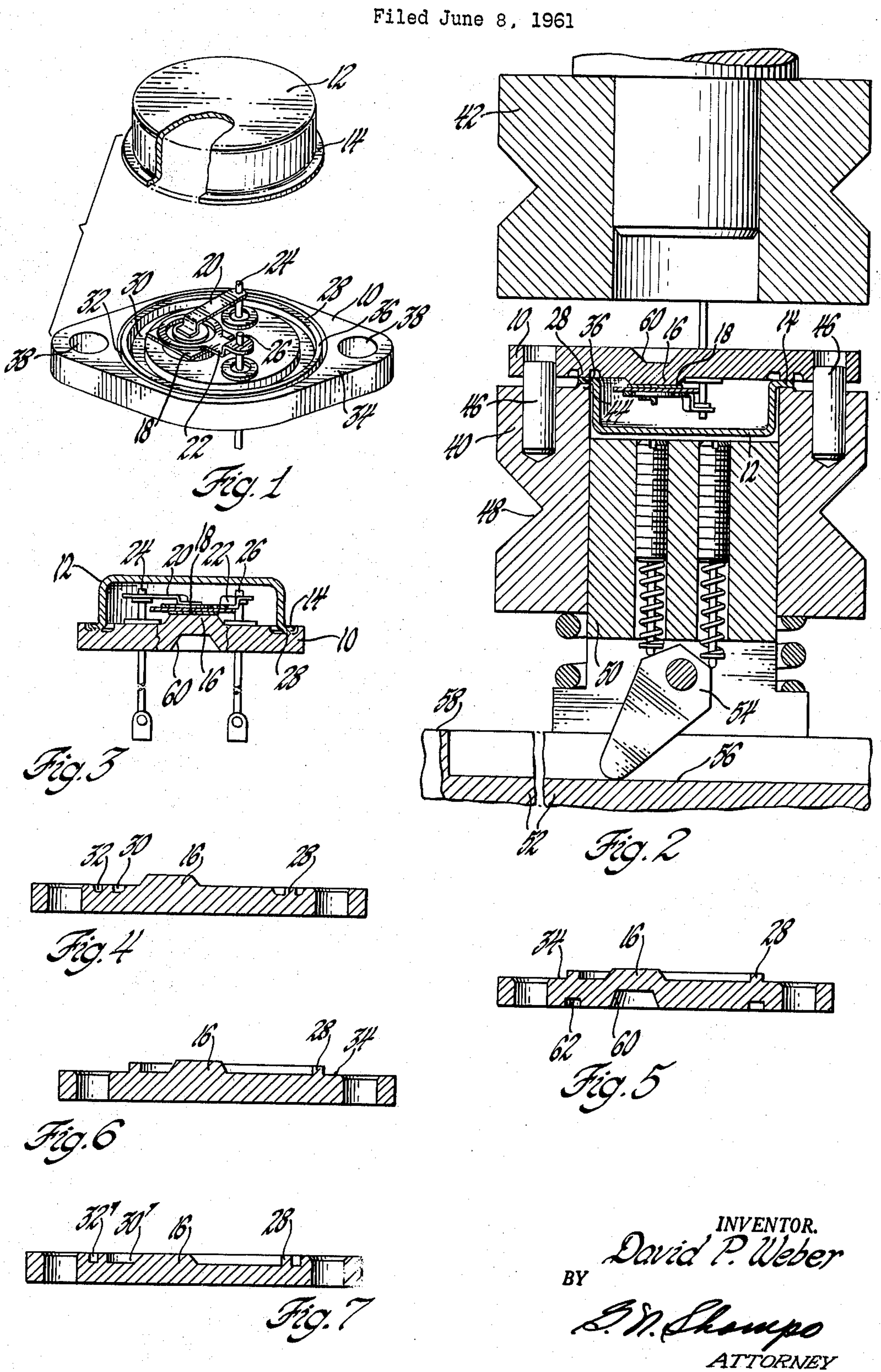

This invention relates to semiconductor signal translating devices and more particularly to a capsule for containing such a device and to a method of making such a capsule.

In recent years the commercial manufacture of semiconductor signal translating devices has grown extensively. While various embodiments of diode and triode constructions have evolved, the problem in encapsulating all of these devices has remained virtually the same. The devices must be hermetically sealed within a closed container, and yet the most commercially desirable sealing methods are not adaptable to the most desirable capsule configurations. Accordingly, the commercial methods of manufacture involved either elaborate processes to produce the desired capsule configuration or a compromise in the desired configuration and method of sealing in order to obtain the eventual commercial product. Obviously neither approach was a completely satisfactory one. If the desired capsule configuration and effectiveness of sealing were not sacrificed, the cost of manufacture was too high. If a compromise was made, the cost was reduced but the most desired article was not produced.

The problem involved was particularly vexing because the desired configuration involved a composite assembly which had to be secured not merely with a strong bond but an imperforate bond that could be expeditiously, economically and consistently formed under commercial production conditions. Moreover, the bond must not only be sufficient to initially produce a hermetic seal, but it must also be strong enough to maintain it though subjected to various dynamic and static stresses. Such stresses frequently are encountered when securing a capsule in an electrical assembly with a power tool and when the capsule is secured to a surface which does not conform to the abutting surface of the capsule.

It is a primary object of the invention to provide a means for solving this problem. My invention provides both an article and a method which possess the preferred article and method characteristics previously set forth.

Other objects, features and advantages of the present invention will become more apparent from the following description of preferred examples thereof and from the drawing in which:

FIGURE 1 perspectively shows an elevational view of a transistor mounting member and a cap therefor in spaced relationship;

FIGURE 2 contains a sectional view through an assembly used to secure the cover member to the transistor mounting member;

FIGURE 3 shows a transverse sectional view through a transistor capsule which has been formed in accordance with the invention; and FIGURES 4 through 7 contain longitudinal sectional views of various modifications of the transistor mounting member shown in FIGURE 1.

Briefly, the invention comprehends a signal translating device capsule having a relatively thick mounting member and a comparatively thin cover member. The cover member is cold welded to the mounting member on a projection thereof removed from the outer periphery of the surface from which it projects. More specifically, the invention encompasses cold welding a circumferential flange on a hollow cylindrical cover member to an annular projection on the surface of a semiconductor mounting member, the projection being removed from the periphery of the surface of which it forms a part.

As previously indicated, however, my invention is of particular importance because it can be used to quickly and economically form a hermetic seal which is highly resistant to rupture under dynamic and static stresses.

The broad aspect of my invention provides a novel method of producing a wide variety of capsule shapes as well as other enclosures. However, unless the projection is of a particular nature and the cold welding conducted as hereinafter described, a hermetic seal will not be obtained.

In order to more fully describe the details of my invention, reference is herewith made to the drawing. FIGURES 1–3 show a transistor capsule assembly formed in accordance with the invention. The capsule involves a diamond-shaped transistor mounting member, or base member 10, and a circumferentially flanged cup-shaped cover member 12. The flange 14 of the cover member 12 extends at right angles to the main axis of the cap for a short distance. The cover is preferably of copper, but can also be of steel, aluminum or the like.

The base member 10 is formed of a metal having good electrical and heat conducting properties, such as copper. It has a centrally located pedestal 16 upon which is disposed a transistor body. The transistor body is adapted to be mounted on the pedestal with the collector electrode 18 thereof being soldered to the top of the pedestal. This both mechanically and electrically connects the transistor to the mounting base. Various other electrodes 20 and 22 are connected to appropriate leads 24 and 26, respectively. These leads extend through the apertures in the base member and are electrically insulated therefrom by glass beads which are fused to form a hermetic seal around the leads.

The area of the base member 10 containing the transistor and leads is encompassed by an annular projection 28 which is formed between two concentric grooves 30 and 32 in the surface 34 of the base member. The projection 28 between the two grooves 30 and 32 is within the outer periphery of the upper surface 34 of the base member. The projection forms an annular land 36 which generally corresponds in radial dimension to the flange 14 on the cover member. An aperture 38 in each end of the base member 10 is used to secure the capsule in an electrical assembly in which it is used.

FIGURE 2 contains a sectional view of an assembly used to secure the flange of the cover to the land on the base. The assembly shows a die set composed of an annular die 40 and back-up tool 42. The die 40 has a projection 44 thereon corresponding to the cover flange 14. The cover 12 and the base member 10 are positioned upside down between them. Locting pins 46 on the die align the land on the base member with the projection on the die and the flange of the cover member. The die is rigidly held vertically immovable by a fixture (not shown) engaging the groove 48 in its side. Downward movement of the back-up tool 42 compresses the cover flange and the projection together to form a cold weld. An ejection assembly associated with the die includes a cylindrical member 50 within the die 40 and a horizontally relatively movable member 52 under it. A toggle cam 54 on the cylindrical member 50 rides in a groove 56 in the movable member 52. As the lower member and the die 40 move laterally with respect to one another, the toggle cam moves to the end of the groove where it pivots and then rides on the surface 58 of the member 52, ejecting the cold welded capsule.

The completed assembly is shown in FIGURE 3. The cover flange 14 and the projection have been sufficiently compressed so that the upper surface of the compressed flange is about level with the surface of the base member.

My invention involves compressing the flange of the cover and the projection between a suitable die and the mass of metal of which the projection is a part. Hence, contrary to all principles of semiconductor device encapsulation, only one welding die is used. The mass of metal underlying the projection forms an anvil to eliminate the need for a second die. Hence, portions of the base member on opposite sides of the projection are not substantially thermally isolated from one another. It is obvious that my concept of encapsulation inherently avoids a major objection to cold welded capsules. There is no extremely thin projecting flange involved. Accordingly, problems associated with such a construction are completely avoided.

Despite the simplicity of cold welding in the manner I have described, perhaps the chief reason why it has not been applied to encapsulation of signal translating devices is that it does not inherently produce a satisfactory cold weld. More importantly, however, it does not inherently produce a hermetic seal. Unless the bonding is performed in accordance with the particular detail hereinafter set forth, a strong cold weld will not be obtained, and even if obtained, it will not be imperforate in the weld zone. A gas permeable weld zone, of course, will not provide a hermetic seal.

I have found that projection cold welding not only can provide the aforementioned ideal type of hermetic seal, but it can also provide it consistently under commercial production conditions. This benefit is only attainable, however, by correlating the height of the projection to the flange thickness, the width of the projection to its height and the die contact area to the land area of the projection and, in addition, accurately controlling the projection collapse. It is this essential combination which is necessary to produce the hermetic seal.

The height of the projection must have a dimension larger than about three-fourths the thickness of the flange. However, the height of the projection must not be greater than about twice the width of the projection. Moreover, the projection must be substantially uniformly collapsed. Projection metal must flow laterally from the weld area in both directions during collapse. The projection must be collapsed in the weld area to at least 65% of its original height. In most instances, however, it is preferred to collapse the projection to at least 50% of its original height. Reducing the height of the projection in the weld area to less than about 25% of its original height is generally objectionable. The underlying mass of base member metal may be undesirably stressed and/or the flange may be objectionably weakened due to excessive reduction in thickness. In either event the strong hermetic seal would not be obtained.

In addition, it is of utmost necessity that the welding tool which is employed have a flange contact area of at least about one-half of the land area of the projection but not more than about 50% greater than the land area of the projection. When the annular land is a flat surface, as shown in the drawing, and the annular die has a flat surface, both of which are perpendicular to the direction of compression, a general criterion is that the width of the die contact surface be one-half to one and one-half the width of the projection. Moreover, when using a cover member having an extremely short radially extending flange, as may be preferred in commercial production, at least the inner diameter of the annular die must be beveled to permit metal flow and avoid pinching the flange from the cover member during cold welding.

Moreover, for commercial production applications greatest tolerance parameters are realized if there is little concentricity deviation for the annular projection, cover flange (if short) and die contact surfaces. The unusually high quality of result obtained with the invention is additionally enhanced by closely registering the land and die contact surface. However, satisfactory results are attainable when only about one-half of the width of the projection is in line with the die.

It is readily apparent that the invention can also be accomplished with base members having land areas formed in a manner other than that attained by the use of concentric annular grooves in the base member and that the projection need not be nonperimetric. The pedestal can also be produced in the surface of the base member by methods other than cold forming.

The cold forming of the pedestal 16 concurrently produces a generally corresponding indentation 60 in the lower surface of the base member opposite the pedestal as shown in FIGURES 2 and 3. It can also be formed by machining a flat sheet as shown in FIGURE 4. The annular projection 28 can also be produced on the surface of the base member in a cold forming operation which, incidentally, would produce a generally corresponding indentation 62 in the lower surface of the base member, such as shown in FIGURE 5.

The base member can be machined from flat stock to produce the pedestal and annular land area by machining the flat stock into a diamond shape and appropriately removing surface portions thereof to leave remaining upstanding on the machined surface an annular projection and the pedestal to which the semiconductor is secured. A base member produced in this manner is shown in FIGURE 6.

To illustrate a further modification of the invention, there is shown in FIGURE 7 a base member in which a circular area of the base member surface has been relieved at 30′ to leave upstanding a pedestal for the semiconductor. An annular groove 32′ is machined in the surface of the base member concentric to the circular relieved area 30′ to leave therebetween the annular projection 28 to which the flange of the cover member is secured.

It is of importance to the embodiments shown in FIGURES 1 through 4 and 7 that the metal have room to laterally flow from the projection. Hence, the relieved areas obviously must be wide enough to accommodate this expansion. However, of more importance in this modification is that the relieved areas be sufficient to allow the entire cap flange 14 to nest within the base members when the projection is collapsed. If not, the flange may be pinched from the balance of the cover, the cover side wall perforated or the cold weld impaired. This is not a consideration, however, when the projection 28 extends above the major surface 34 of the base member as in FIGURES 5 and 6.

It is to be understood that the term "annular," as used herein, not only encompasses perfectly circular forms but also generally circular forms, such as elipses, polygons, and the like. Hence the terms "cylindrical," "circumferential," "circular," etc., are analogously used. While only a transistor capsule has been described herein, the present method of encapsulation is also useful for making other devices, including rectifiers, relays, switches, etc. The term "signal translating device" includes both transistors and rectifiers.

Although this invention has been described in connection with certain specific examples thereof, no limitation is intended thereby except as defined in the appended claims.

I claim:

1. The method which comprises providing a cup-shaped cover member having a circumferential laterally extending flange on its lip, providing a relatively thick diamond-shaped base member having good electrical and thermal conducting properties, forming two concentric annular grooves in said base member so as to provide an annular projection therebetween generally corresponding to the flange on said cover member, said annular projection being about ¾ to twice the cover flange thickness, the innermost of said grooves being wider than the other and having an inner diameter slightly smaller than the inner diameter of said cover member, securing an electrode of a junction transistor to said base member within the area bounded by the innermost of said grooves with electrode and base terminals passing through apertures in said base member, sealing said terminal apertures in a dry air atmosphere, uniformly compressing said flange against said projection, and uniformly collapsing the projection to about 50–25% of its original height against an underlying mass of the base member, whereby said cover flange is nested within said grooves and imperforately cold welded to said base member.

2. A method of encapsulating a signal translating device, said method comprising forming a nonperimetric annular projection on a metallic base member, providing a hollow cover member having a circumferential flange thereon generally corresponding to said projection, said projection having a height larger than about three-fourths the thickness of said flange and not greater than about twice its width, securing a signal translating device to said base member within the area bounded by said projection, uniformly compressing said flange against said projection, and uniformly collapsing said projection to about 50–25% of its original height against an underlying mass of said base member.

3. A method of encapsulating a signal translating device, said method comprising forming a first relieved area on a metallic base member, forming a second relieved area on said base member spaced from said first relieved area to form an annular projection therebetween, providing a hollow cover member having a circumferential flange thereon generally corresponding to said projection, said projection having a height larger than about three-fourths the thickness of said flange and not greater than about twice its width, securing a signal translating device to said base member in the area bounded by said projection, compressing said flange against said projection with an annular die having a contact surface area between about one-half to one and one-half the land area on said projection and collapsing said projection under compression to at least about 65% and no more than 25% of its original height to form an imperforate cold weld.

4. A method of encapsulating which comprises forming a nonperimetric annular projection on a metallic base member, providing a hollow cover member having a circumferential flange thereon generally corresponding to said projection, said projection having a height larger than about three-fourths the thickness of said flange and not greater than about twice its width, compressing said flange against said projection with an annular die having a contact surface area between about one-half to one and one-half the land area on said projection and collapsing said projection under said compression against an underlying mass of the base member to at least about 65% of its height.

References Cited by the Examiner

UNITED STATES PATENTS

| | | | |
|---|---|---|---|
| 2,939,204 | 6/1960 | Knott et al. | 317—234 X |
| 2,975,928 | 3/1961 | Roovers | 29—470.1 X |
| 3,024,299 | 3/1962 | Nijhuis et al. | 174—50 |
| 3,113,252 | 12/1963 | Matea | 174—52 X |
| 3,178,811 | 4/1965 | Fuller | 29—470.1 |

FOREIGN PATENTS

| | | |
|---|---|---|
| 1,236,172 | 6/1960 | France. |

ROBERT K. SCHAEFER, *Primary Examiner.*

JOHN P. WILDMAN, JOHN F. BURNS, *Examiners.*

L. E. ASKIN, *Assistant Examiner.*